(12) United States Patent
Nagai et al.

(10) Patent No.: US 7,131,829 B2
(45) Date of Patent: Nov. 7, 2006

(54) SPIRAL DIE ASSEMBLY

(75) Inventors: Toshiaki Nagai, Yokohama (JP); Mikiyasu Masaki, Yokohoma (JP); Shigejiro Yamaguchi, Yokohama (JP)

(73) Assignee: Yamaguchi Mfg. Works, Ltd., Kanagawa (JP)

( * ) Notice: Subject to any disclaimer, the term of this patent is extended or adjusted under 35 U.S.C. 154(b) by 222 days.

(21) Appl. No.: 10/882,267

(22) Filed: Jul. 2, 2004

(65) Prior Publication Data
US 2006/0003043 A1    Jan. 5, 2006

(51) Int. Cl.
*B29C 47/24*   (2006.01)
*B29C 47/94*   (2006.01)

(52) U.S. Cl. .............. 425/107; 425/215; 425/380; 425/381.2; 425/382.3; 425/466; 425/467

(58) Field of Classification Search ........... 425/107, 425/215, 380, 381, 381.2, 382.3, 382.4, 466, 425/467
See application file for complete search history.

(56) References Cited

U.S. PATENT DOCUMENTS

| | | | | |
|---|---|---|---|---|
| 2,937,402 A | * | 5/1960 | Pierce | 425/206 |
| 3,008,187 A | * | 11/1961 | Slade | 264/119 |
| 4,076,481 A | * | 2/1978 | Sansone | 425/380 |
| 4,298,325 A | * | 11/1981 | Cole | 425/192 R |
| 4,365,946 A | * | 12/1982 | Anders | 425/144 |
| 5,648,104 A | * | 7/1997 | El-Sobky | 425/131.1 |
| 6,197,239 B1 | * | 3/2001 | Kirjavainen et al. | 264/209.2 |
| 6,309,574 B1 | * | 10/2001 | Jarvenkyla et al. | 264/126 |
| 6,447,279 B1 | * | 9/2002 | Guillemette et al. | 425/107 |

FOREIGN PATENT DOCUMENTS

| | | |
|---|---|---|
| JP | 54-105158 | 8/1979 |
| JP | 57-152921 | 9/1982 |
| JP | 02-78517 | 3/1990 |
| JP | 46-35988 | 10/1997 |
| JP | 2002-234065 | 8/2002 |
| JP | 2004-330698 | * 11/2004 |

* cited by examiner

*Primary Examiner*—Joseph S. Del Sole
*Assistant Examiner*—Joseph Leyson
(74) *Attorney, Agent, or Firm*—James Creighton Wray

(57) ABSTRACT

A spiral die assembly can obtain a homogeneous pipe body, an inflation film with/without drawing and a functional film by dispersing molten resin homogeneously, and the spiral die assembly is capable of being applied to various molten resins and extruding conditions. The spiral die assembly comprises a main body 1 of said spiral die assembly, a mandrel 2 having a spiral groove 3 around its outer surface inserted on the inside of the main body and a rotatable ring 5 having a desired width fitted along the outer surface of the spiral groove 3 and fitted in a portion of a die cylinder which forms the inner surface of the main body 1 in a range corresponding to both ends of the spiral groove 3.

3 Claims, 9 Drawing Sheets

51 : Die Carrier
52 : Breaker Plate Die
53 : Sylindrical Body
54 : Mandrel
55 : Central Path

SPIRAL DIE ASSEMBLY

BACKGROUND OF THE INVENTION

1. Field of the Invention

The present invention relates to a spiral die assembly suitable for forming tubular body by an extrusion molding.

2. Brief Description of the Related Art

In conventional extrusion molding methods for forming tubular bodies, a spider die which frequently causes spider marks and a straight die which tends to cause uneven thickness in molded products are not employed, but spiral die assemblies as shown in FIGS. 4A and 4B are employed instead. In such a spiral die assembly a spiral groove 3 is formed on the outer surface of a mandrel 2 which is inserted in a main body 1 of the die assembly. Molten resin supplied from an extruder is usually introduced into the mandrel via an inlet 31 and divided its flow path into two to eight flow paths at a dividing inlet 32, and finally moved to a die lip (rightmost end of FIG. 4A or 4B) via the spiral groove 3. Depth of the spiral groove 3 is gradually decreasing toward the die lip. Portion of molten resin is moved between the inner surface of the main body 1 and the mandrel 2 as molten resin being moved in the spiral groove 3 and its flow is adjusted in a reserving portion 33 (see FIG. 4B) and a straight portion (a land portion: a rip gap portion), so that molten resin reaches to the die lip in an adjusted flow. Sometimes, a spiral die assembly having no reserving portions (see FIG. 4A) is used depending on products to be molded.

Except the above-mentioned spiral die assemblies, various dies have been proposed in order to homogenize molten resin at the outlet of the die lip.

1) When a porous pipe is formed out of high viscous material, the material between a cylinder and a mandrel is heated by frictional force in order to disperse strands after passing a breaker plate or in order to adhere and to polymerize powdered material. The frictional heat is obtained by rotating the cylinder. The Japanese laid open patent No. 8-57936 (reference 1) discloses a die arrangement such that a die for extrusion molding and a molded product can be relatively rotated (see FIG. 5). The relative rotation is continuously or intermittently executed and is controlled its rotational mode and degree of the rotation so as to control properties of the molded products.

2) The Japanese laid open patent No. 59-9035 (reference 2) discloses a method to modify a thickness of an extruded pipe by controlling a gap between a die and a rotatable eccentric nipple (mandrel) and also controlling a detected temperature difference in a circumferential direction. In the extruder for forming the pipe, a cross head 62 in which a resin passage between a die 64 and a nipple 65 is eccentrically arranged except at the end of the resin passage (see FIG. 6) and a sensor is arranged to detect temperature of molten resin in the radial direction. The die and the nipple are arranged such that either one of them can be rotated around an axis for preventing uneven thickness in the extruded product.

3) The Japanese laid open patent No. 10-29237 (reference 3) discloses a molding method for forming laminated products out of different materials. Distributed and leaked different materials from spiral grooves can be laminated in a predetermined order by rotating a mandrel equipped with the spirals (see FIG. 7).

Usually in a die assembly, a molten resin flow along the inner surface of the cylinder (hereinafter referred as "land flow") and molten resin flows in spiral grooves (hereinafter referred as "spiral flow") are moved to a die lip as a flow ratio between the two molten resin flows being kept in a fixed balance. This fixed balance is very important in order to keep good appearance in the molded pipes. When the balance breaks, defects such as streak, uneven appearance, uneven thickness, uneven strength and the like appear in the molded pipes.

An appropriate balance between the land flow and the spiral flow is empirically determined according to a width of the spiral groove, a depth of the groove, a pitch of the groove and the like. And the appropriate balance is also varied according to a flow rate, a temperature, a visco-elasticity of molten resin and the like. When the balance is varied, weld marks are frequently formed in the molded products, since proper measures against such varied balance are not established. Sometimes molten resin is kneaded in order to eliminate weld marks by raising the temperature and lowering the visco-elasticity of molten resin, but uneven thickness, contamination (die marks etc.) due to thermal degradation of the molten resin and like are caused.

A round die or a flat die is used in the extruder for forming molten and kneaded resin into a desired shape.

A pipe body such as film, pipe, blown container, net and the like are formed through the round die. Performance of the die for distributing molten resin uniformly around a circumference on an imaginary plane, affects quality of the pipe body, except molding asymmetrical product out of molten resin extruded from the die lip. When the molten resin is not distributed uniformly or homogeneously around the circumference, the following defects are caused: (a) uneven thickness, (b) deteriorated appearance (weld mark, streak, unevenness, wrinkle and so forth), (c) dispersion in strength, (d) dispersion in electrical properties, and the like. In addition, the round die has the following problems: difficulty to substitute remaining resin in the groove with different type of new resin, to require a considerable time and a considerable amount of wasted resin for substituting resins.

Since visco-elasticity of molten resin in the die depends on its temperature and pressure, and varies according to its flow rate, a molten resin flow in the die should be controlled variably. But the molten resin flow in a straight portion (land portion) near the die lip should be controlled by a fixed means in order to attain stable and straight flow.

The weld mark (weld line) mentioned in (b) means a fine line appearing in the extruded pipe, in other words "a streaked state" when molten resin being flowed in the grooves are combined but not mixed homogeneously.

These problems cannot be solved in the above-mentioned prior arts (spiral dies shown in FIGS. 4A and 4B and references 1 to 3).

SUMMARY OF THE INVENTION

The present invention is carried out in view of the above-mentioned prior arts in order to obtain a homogeneous pipe body, an inflation film with/without drawing and a functional film by dispersing molten resin homogeneously and in order to provide a spiral die capable of being applied to various molten resins and extruding conditions.

The following arrangements by the present invention can solve the above-mentioned problems.

(1) A spiral die assembly comprising: a main body of the spiral die assembly; a mandrel having a spiral groove around its outer surface inserted in the inside of the main body; and a rotatable ring having a desired width fitted along the outer surface of the spiral groove and fitted in a portion of a die cylinder which forms the inner surface of the main body in a range corresponding to both ends of the spiral groove, wherein: molten resin is leaked into sliding gaps between the rotatable ring and the main body in order to function as a lubricant; and a discharging mechanism having passages and a needle valve for controlling amount of the molten resin to be discharged out of the spiral die assembly via the passages.

(2) The spiral die assembly according to (1), wherein: the rotatable ring is controlled to rotate at a rate less than 60 rpm.

(3) The spiral die assembly according to (1), wherein: the inner surface of the rotatable ring is finished so as to have a mirror grade (a range between 0.1S and 6.3S by the Japanese Industrial Standard 0601-1976), a satin finishing (a depth range between 4μ and 150μ) or a tooth formed surface (parallel or spirally arranged).

Note: The above-referred value "0.1S" by the Japanese Industrial Standard, means that average distance between pairs of neighboring peaks of measured surface roughness of a molded product, is 0.1 mm.

BRIEF DESCRIPTION OF THE DRAWINGS

FIG. 1A illustrates an engaging relation between a ratatable ring and pinions (small gears). FIG. 1B is a sectional view of the spiral die assembly.

FIG. 4A shows a spiral die assembly having no reserving portion. FIG. 4B shows a spiral die assembly having a reserving portion.

DETAILED DESCRIPTION OF THE PREFERRED EMBODIMENTS

Figure 1A:
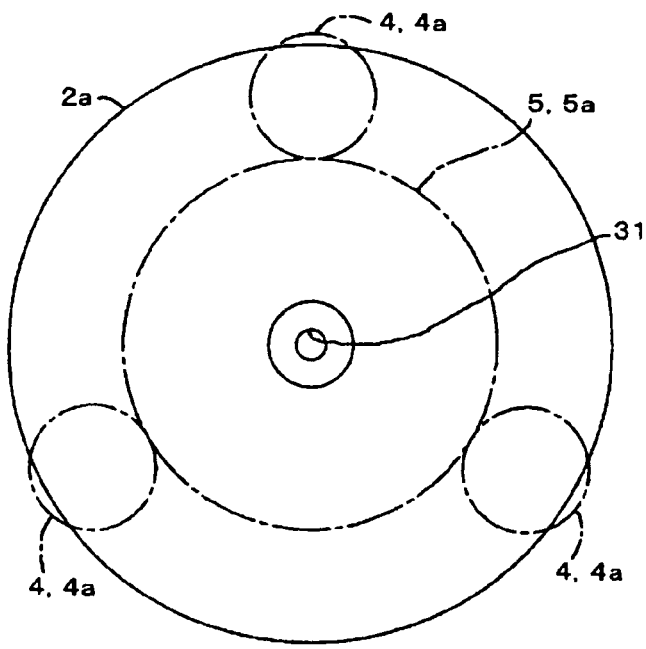
FIGS. 1A and 1B are explanatory views illustrating an arrangement of the main portion of a spiral die assembly by the present invention.

Hereinafter embodied examples of the spiral die assembly by the present invention are explained as referring to the drawings.

Figure 1B:
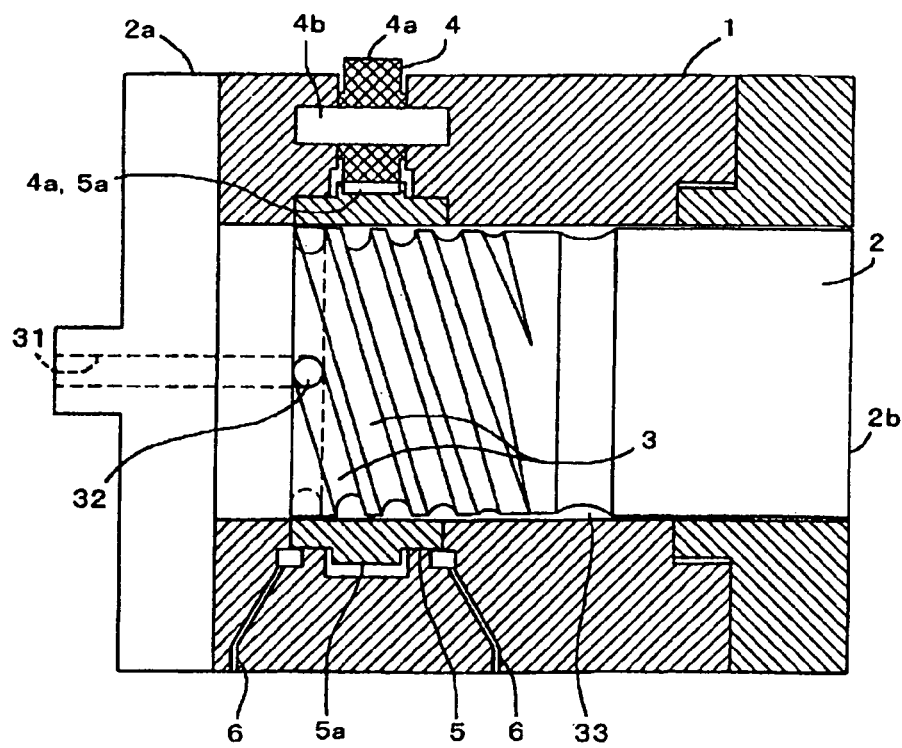

As shown in FIGS. 1A and 1B, the spiral die assembly by the present invention suitable for forming a pipe body by an extrusion method, is constituted such that a mandrel 2 having a monolithically formed flange 2a and a spiral groove 3 on its outer surface, is pressed into the inside of a main body 1 of the spiral die assembly. A rotatable ring 5 with a desired width is rotatably arranged around the outer peripheral surface of the spiral groove in a portion of a die cylinder which forms the inside of the main body 1 of the spiral die assembly and also in a corresponding range between both ends of the spiral groove 3. The flange 2a is connected to an extruder (not shown) such that molten resin from the extruder flows into an inlet 31 and supplied to the spiral groove 3 via divided inlet 32.

As shown in FIG. 1B the spiral groove 3 formed on the outer surface on the mandrel 2 gradually decreases its depth in a right side direction and is led to reserving portion 33 and a straight formed portion between the main body 1 of the spiral die assembly and the mandrel 2.

The rotatable ring 5 has a function to homogenize a molten resin flow by dispersing molten resin properly in a circumferential direction by selecting its rotating direction clockwise or counterclockwise and selecting a rotating rate depending on properties of the resin, extruding conditions and the like.

The rotatable ring 5 (can be rotatable in clockwise and counterclockwise directions) can be controlled under a rate of 60 rpm. An inner surface 5b (see FIG. 2) of the rotatable ring 5 is finished so as to have a mirror grade finishing range between 0.1S and 6.3S preferably between 0.1S and 1.6S by the Japanese Industrial Standard (JIS B 0601-1976), a satin finishing with a depth range between 4μ and 150μ preferably between 4μ and 50μ or one of the tooth formed surfaces (parallel or spirally arranged: see FIGS. 3A, 3B and 3C).

Surface roughness of the inner surface 5b of the rotatable ring 5 can be selected so as to obtain a proper degree of dispersion depending on properties of the molten resin, extruding parameters and the like.

Figure 2:
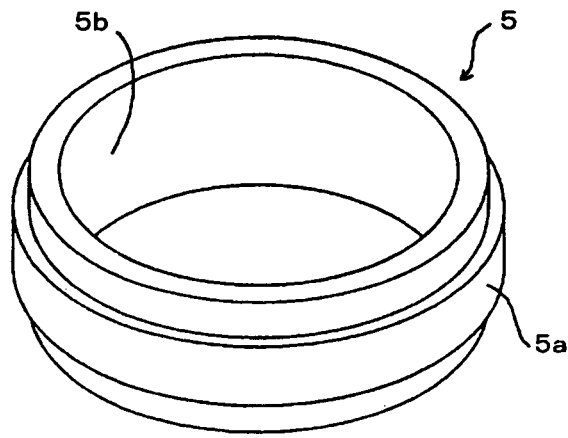
FIG. 2 is a perspective view of the rotatable ring.
Figure 3A:
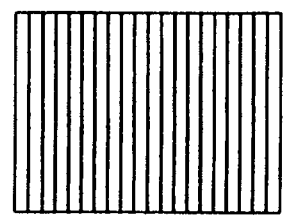
FIGS. 3A, 3B and 3C explanatory views illustrating tooth formed examples of the inner surface of the rotatable ring.
Figure 3B:
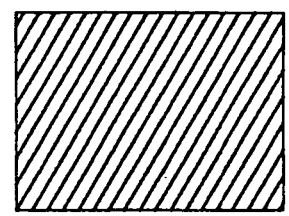
Figure 3C:
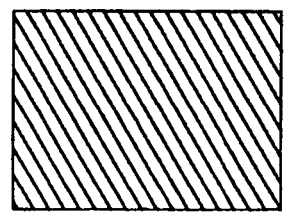
Figure 4A:
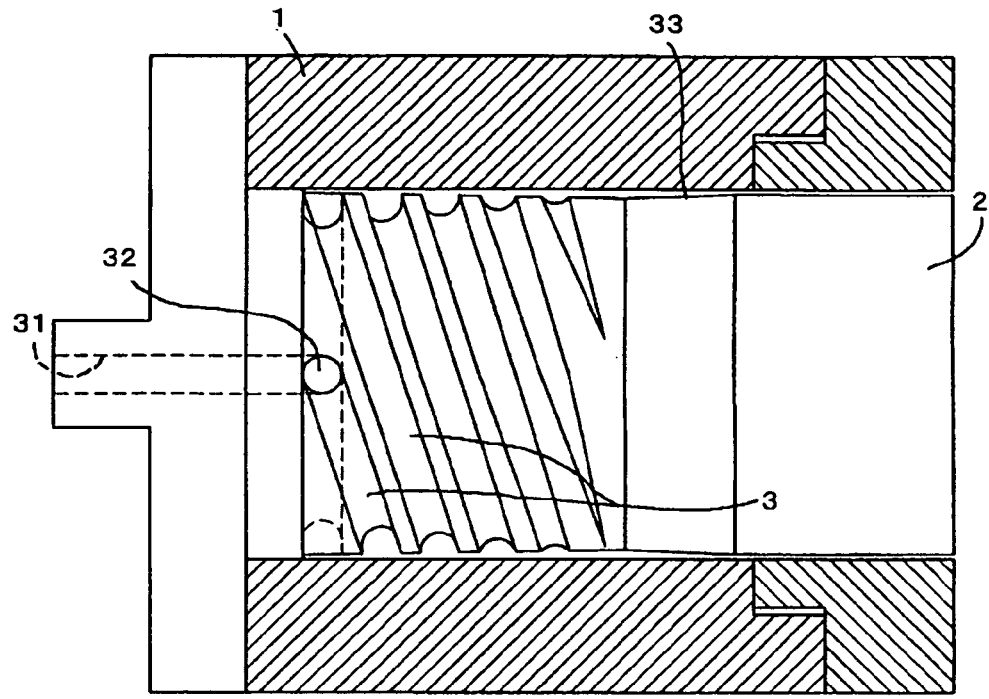
FIGS. 4A and 4B are sectional views illustrating conventional spiral die assemblies.
Figure 4B:
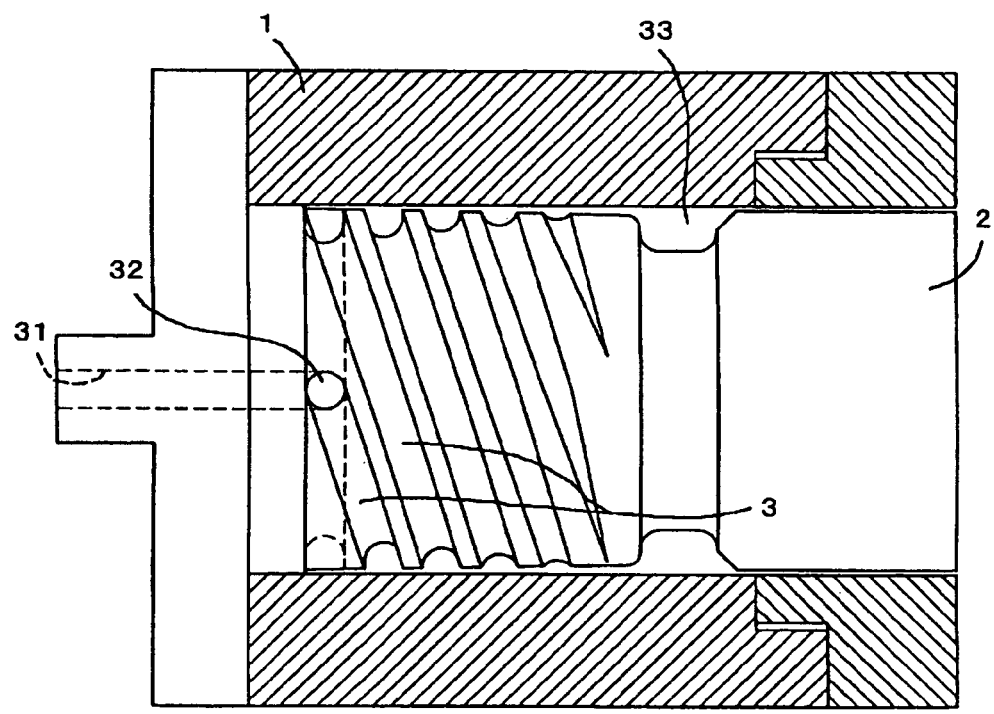
Figure 5:
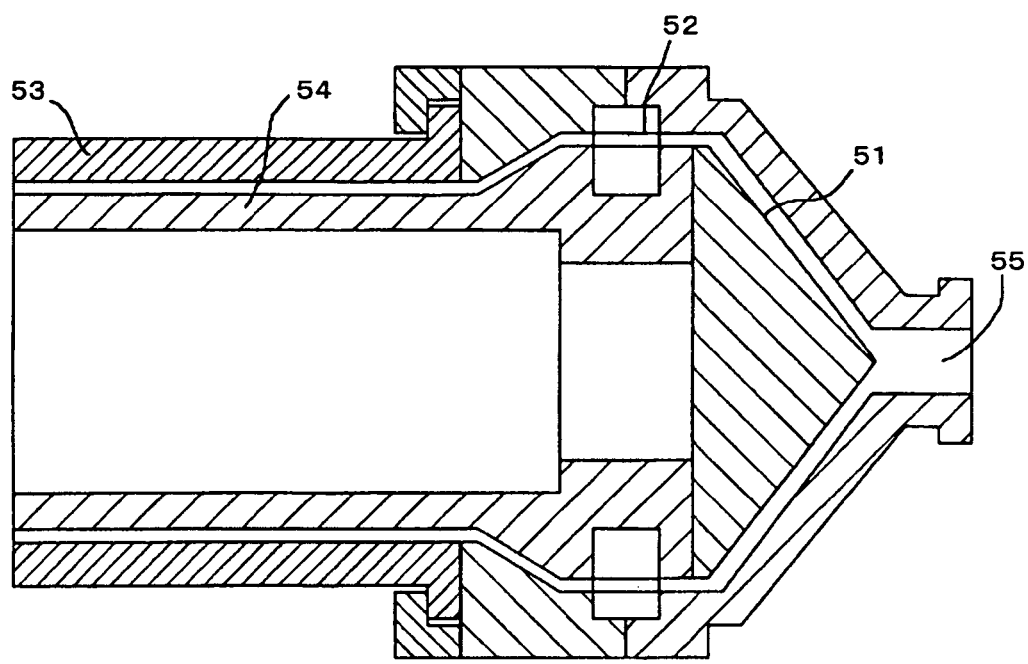
FIG. 5 is a sectional view illustrating an arrangement of the main portion of the die by reference 1.
Figure 6:
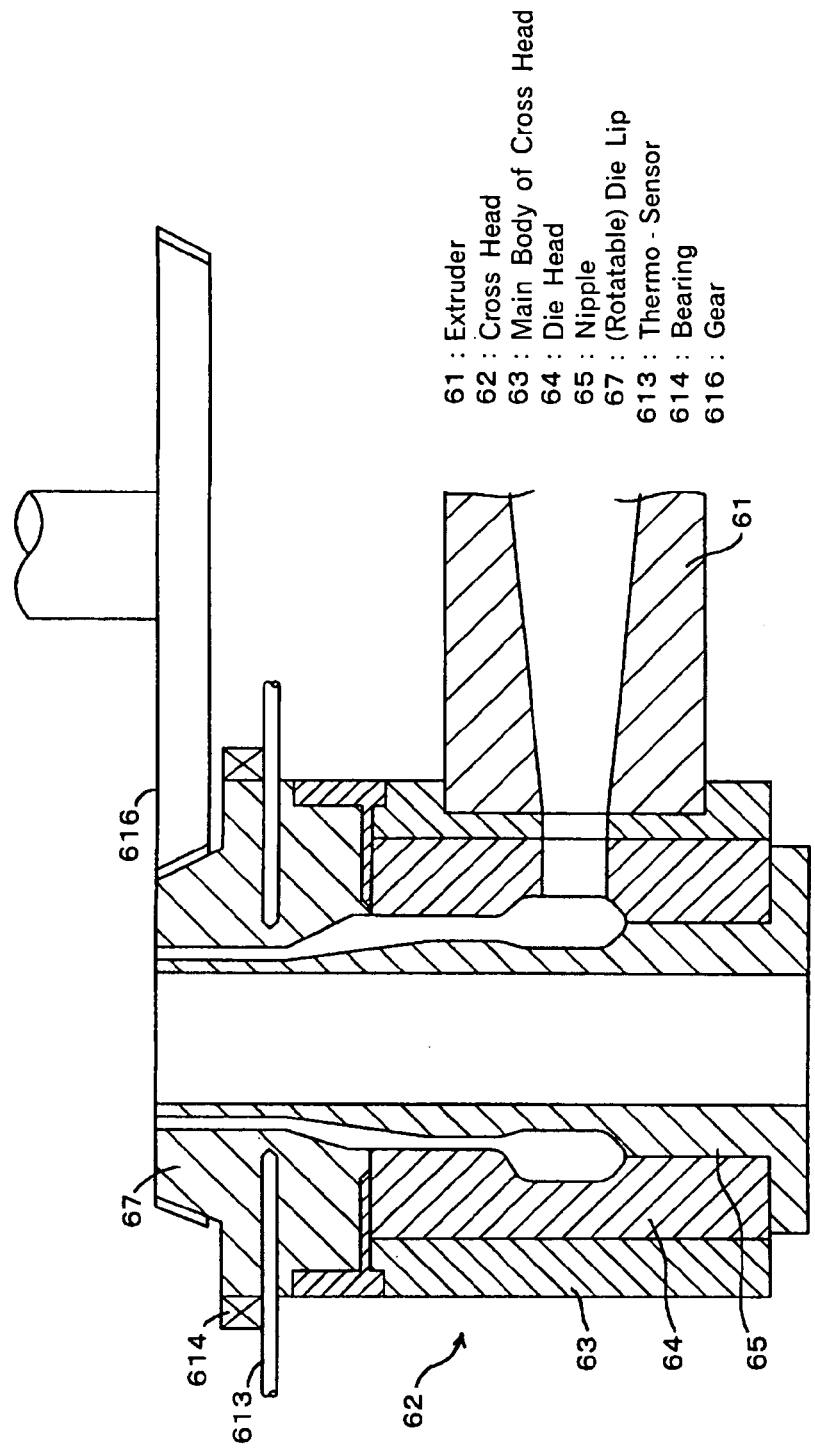
FIG. 6 is a sectional view illustrating an arrangement of the main portion of the die by reference 2.
Figure 7:
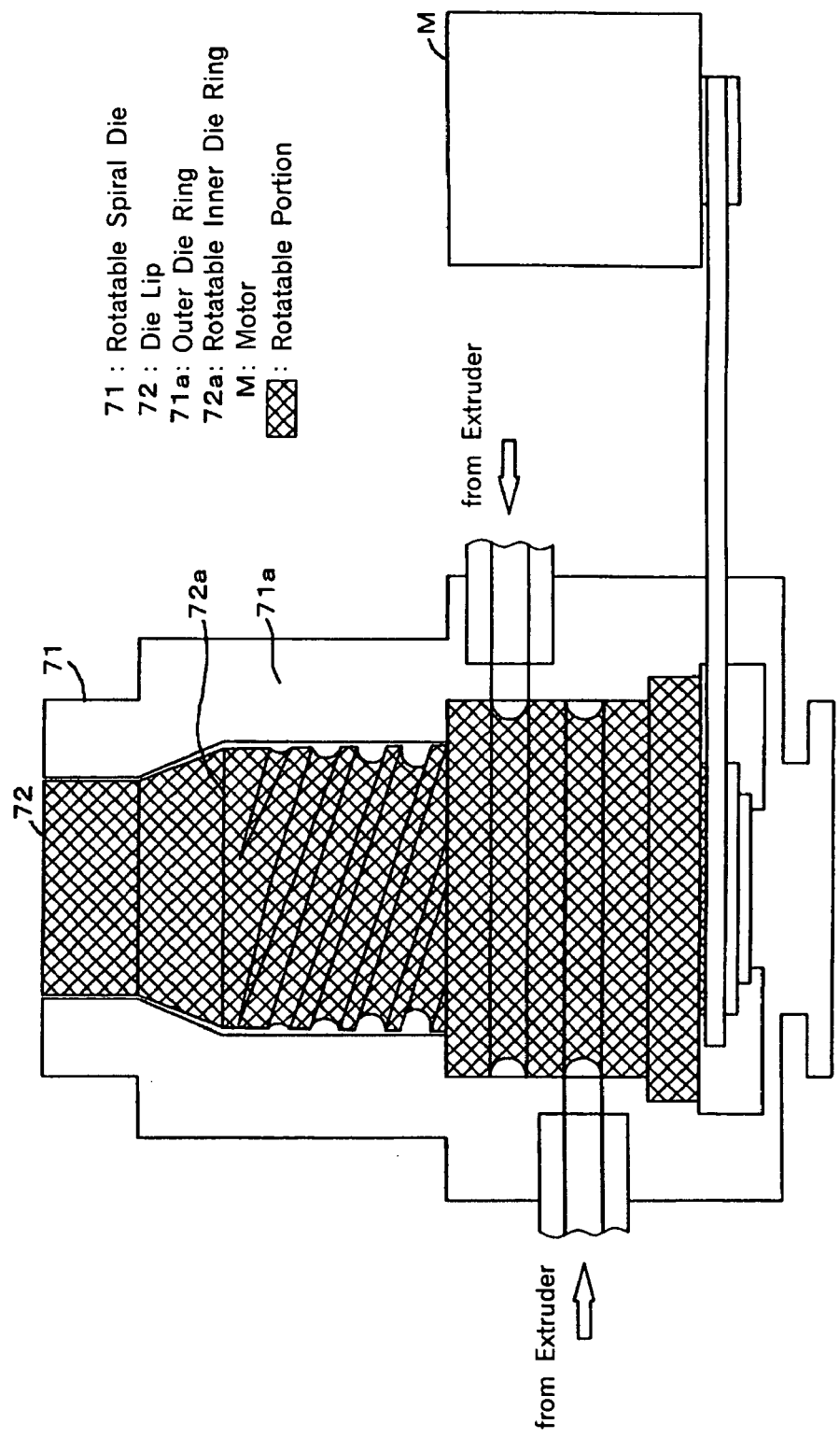
FIG. 7 is a sectional view illustrating an arrangement of the main portion of the die by reference 3.

As shown in FIG. 2, the rotatable ring 5 has gear teeth 5a so that the rotatable ring 5 is formed as a gear. The gear teeth 5a are engaged with gear teeth 4a of three or more pinions (small gears) 4 which are fitted to the main body 1 of the spiral die assembly via axe 4b, so that the rotatable ring 5 can be rotated via pinions 4 (see FIGS. 1A and 1B). A rotation axis of the rotatable ring 5 can be secured with good precision by arranging three or more pinions (small gears) 4.

One of the features of the spiral die assembly is characterized by that the reserving portion 33 is formed on the mandrel 2 having the spiral groove 3 between the end of the spiral groove 3 and the straight portion (land: lip gap) of a die lip 2b. Molten resin flows can be improved more by adjusting the size of the reserving portion 33.

In order to prevent a burning of the rotatable ring 5, molten resin is leaked into sliding gaps between the rotatable ring 5 and the main body 1 of the spiral die assembly as a lubricant, which is discharged by a discharging mechanism (not shown) having passages 6. The discharging mechanism has a needle valve for controlling a discharging rate and also has cooling fins around a discharging pipe, through which the cooled resin as the lubricant is discharged out of the spiral die assembly.

A width of the rotatable ring 5 can be adjusted any dimension from ahead of the beginning the spiral groove 3 to beyond the end of the spiral groove 3. In other words, the rotatable ring 5 with a minimum width of "a spiral pitch+a width of the groove" or with a maximum width of "the whole width of the spiral groove" can be arranged so as to face the spiral groove 3, so that optimum setting requirements can be attained.

In order to lubricate sliding gaps between the rotatable ring 5 and the main body of the spiral die assembly and in order to prevent foreign materials from flowing into the lubricant, controlled and leaked molten resin is guided as the lubricant into a annular groove formed on sliding surfaces of the main body 1 of the spiral die facing the outer peripheral surface of the rotatable ring 5 and portions of both sides of the gear teeth 5a and finally discharged out of the spiral die assembly.

Hereinafter extruding examples, in which parameters are varied, are explained.

The spiral die by the present invention is fitted to an extruder and polypropylene inflation films are formed.

<Specifications of the Extruder>

Outer diameter of screw: D=50 mm, effective length of screw: L=1433 mm, L/D=28 flight pitch (fixed)=50 mm, screw compression ratio: 3.8, outlet diameter of spiral die=155 mm, inner diameter of air ring=300 mm, and a cooling ring, stabilizing plates, pinch rollers and product winding rollers are arranged in the extruder.

(Extrusion Test 1)

Inflation material: polypropylene resin, extruder temperature: 200° C., head temperature: 200° C., die temperature: 200° C., extruding rate: 33 kg/hr and receiving rate: 30 m/min. Inflation films with a width of 320 mm and a thickness of 30μ are stably obtained by employing the spiral die illustrated in FIGS. 1A and 1B.

<Extruding Condition 1A>

Inflation films are formed without rotating the rotatable ring 5. Film thickness is adjusted after inflated film is stabilized.

<Extruding Conditions 1B~4B>

Inflation films are formed as the rotatable ring 5 being rotated according to TAB. 1.

TABLE 1

|    | Rotational Direction | RPM | Seconds/ 1 Rotation |
|----|----------------------|-----|---------------------|
| 1B | Clockwise            | 0.4 | 150                 |
| 2B | Clockwise            | 0.8 | 75                  |
| 3B | Counterclockwise     | 0.4 | 150                 |
| 4B | Counterclockwise     | 0.8 | 75                  |

Note:
1) Clockwise direction corresponds to a spiral winding direction of the spiral die.
2) Counterclockwise direction corresponds to a reverse winding direction of the spiral of the spiral die.

(Extrusion Test 2)

15 kg of polypropylene resin mixed with 1% of a pigment (hereinafter referred as "colored material"), is prepared. After 5 kg of the colored polypropylene resin is extruded, Polypropylene resin with 0% of pigment (hereinafter referred as "non-colored material") is extruded until extruded resin shows no traces of the pigment. Consumed amounts of non-colored material are measured in respective cases with/without rotating the rotatable ring.

Compared results of the extrusion test 1 are shown in TAB. 2.

TABLE 2

| Rotational Direction | RPM | Seconds/ 1 Rotation | Is weld Mark observed? | Thickness (μ) | Fluctuation in thickness (μ) |
|----------------------|-----|---------------------|------------------------|---------------|------------------------------|
| 1A No Rotation       | —   | —                   | Yes                    | 28            | 9                            |
| 1B Clockwise         | 0.4 | 150                 | No                     | 27            | 6                            |
| 2B Clockwise         | 0.8 | 75                  | No                     | 27            | 6                            |
| 3B Counter-Clockwise | 0.4 | 150                 | No                     | 27            | 5                            |

TABLE 2-continued

| Rotational Direction | RPM | Seconds/ 1 Rotation | Is weld Mark observed? | Thickness (μ) | Fluctuation in thickness (μ) |
|----------------------|-----|---------------------|------------------------|---------------|------------------------------|
| 4B Counter-Clockwise | 0.8 | 75                  | No                     | 27            | 4                            |

Figure 8:
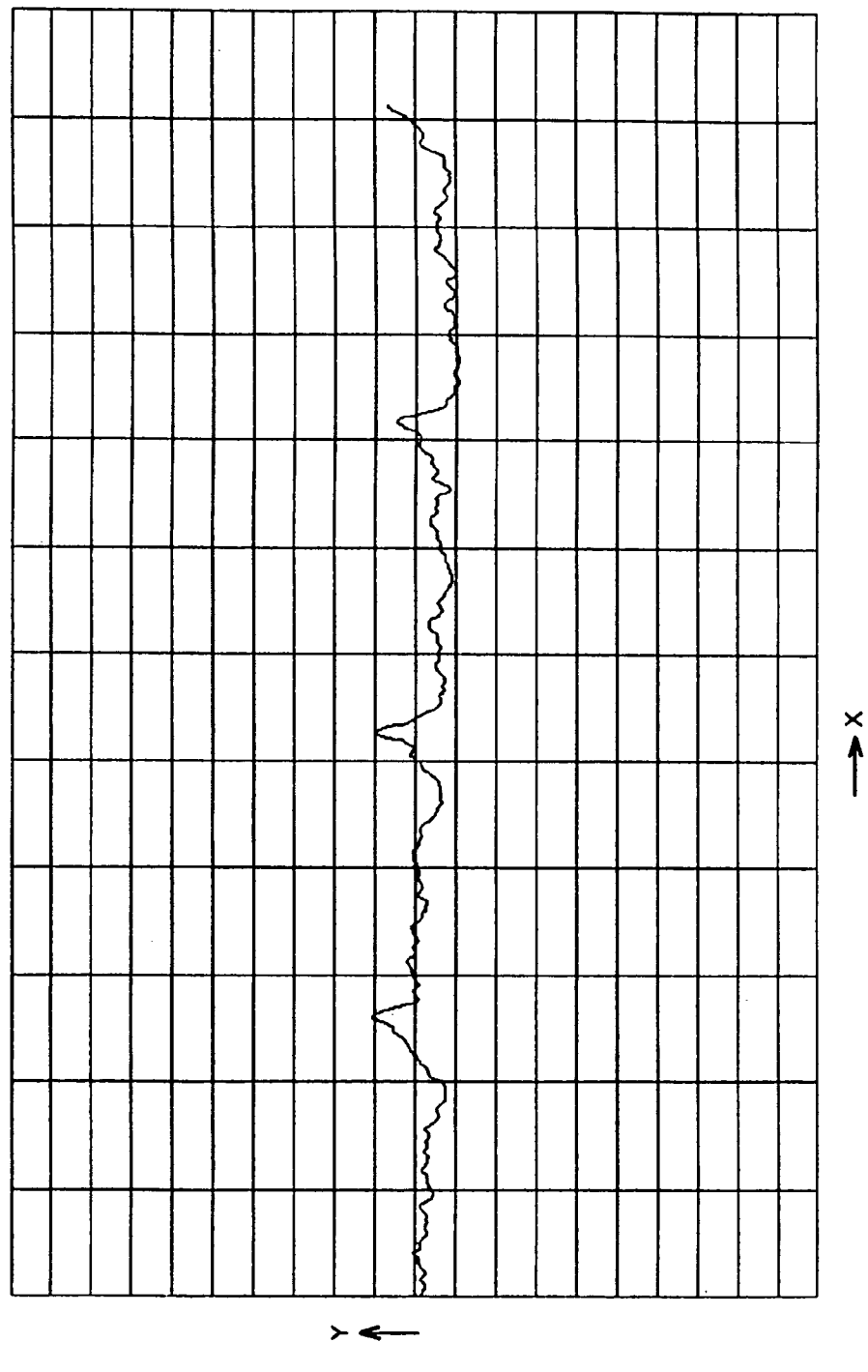
FIG. 8 is a graph showing surface appearance (thickness fluctuation) of a molded film without rotating the rotatable ring.

FIG. 8 shows fluctuation in thickness of the film formed according to the extruding condition 1A.

Figure 9:
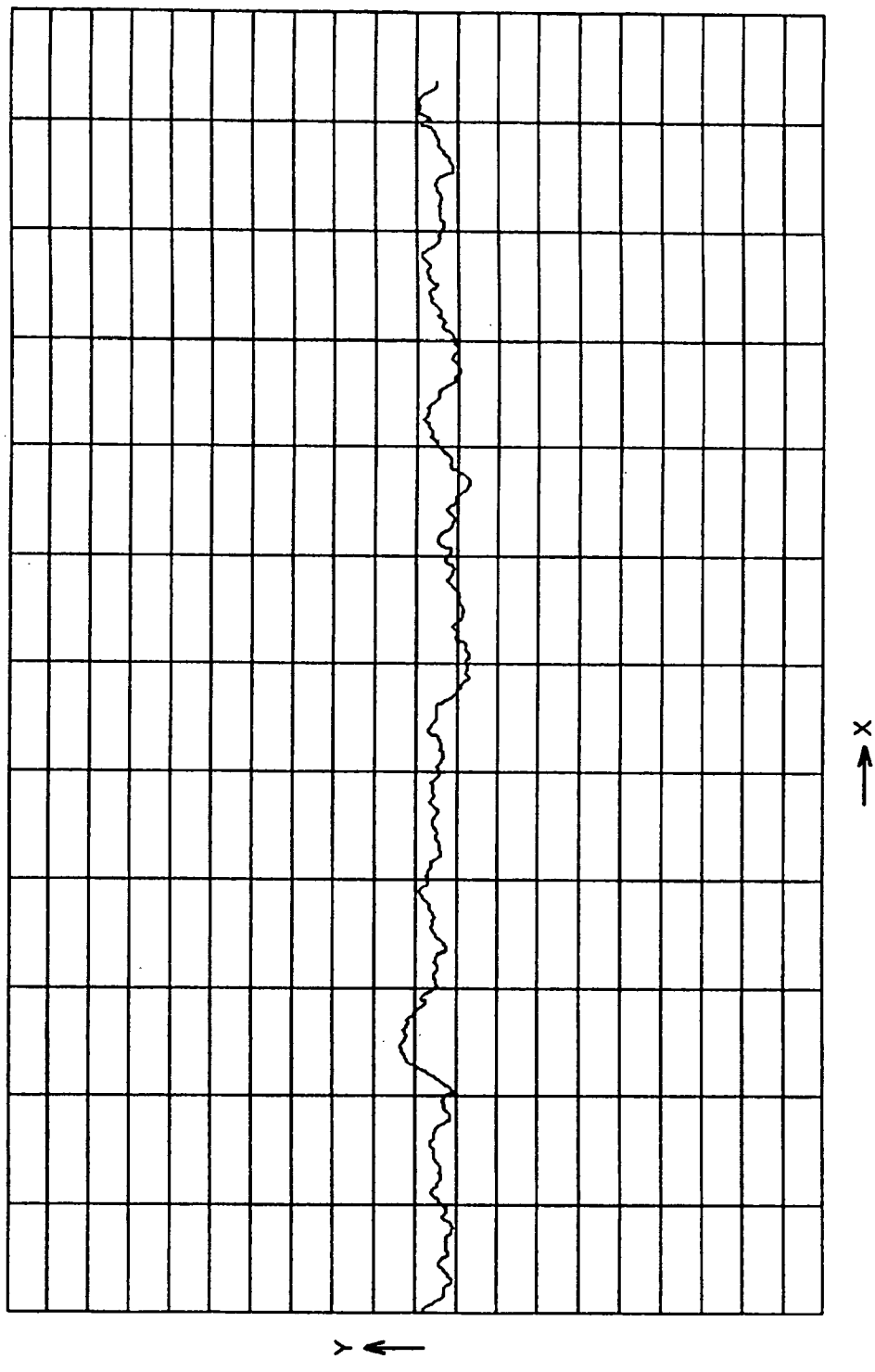
FIG. 9 is a graph showing surface appearance (thickness fluctuation) of a molded film by rotating the rotatable ring clockwise.

FIG. 9 shows fluctuation in thickness of the film formed according to the extruding condition 1B.

Figure 10:
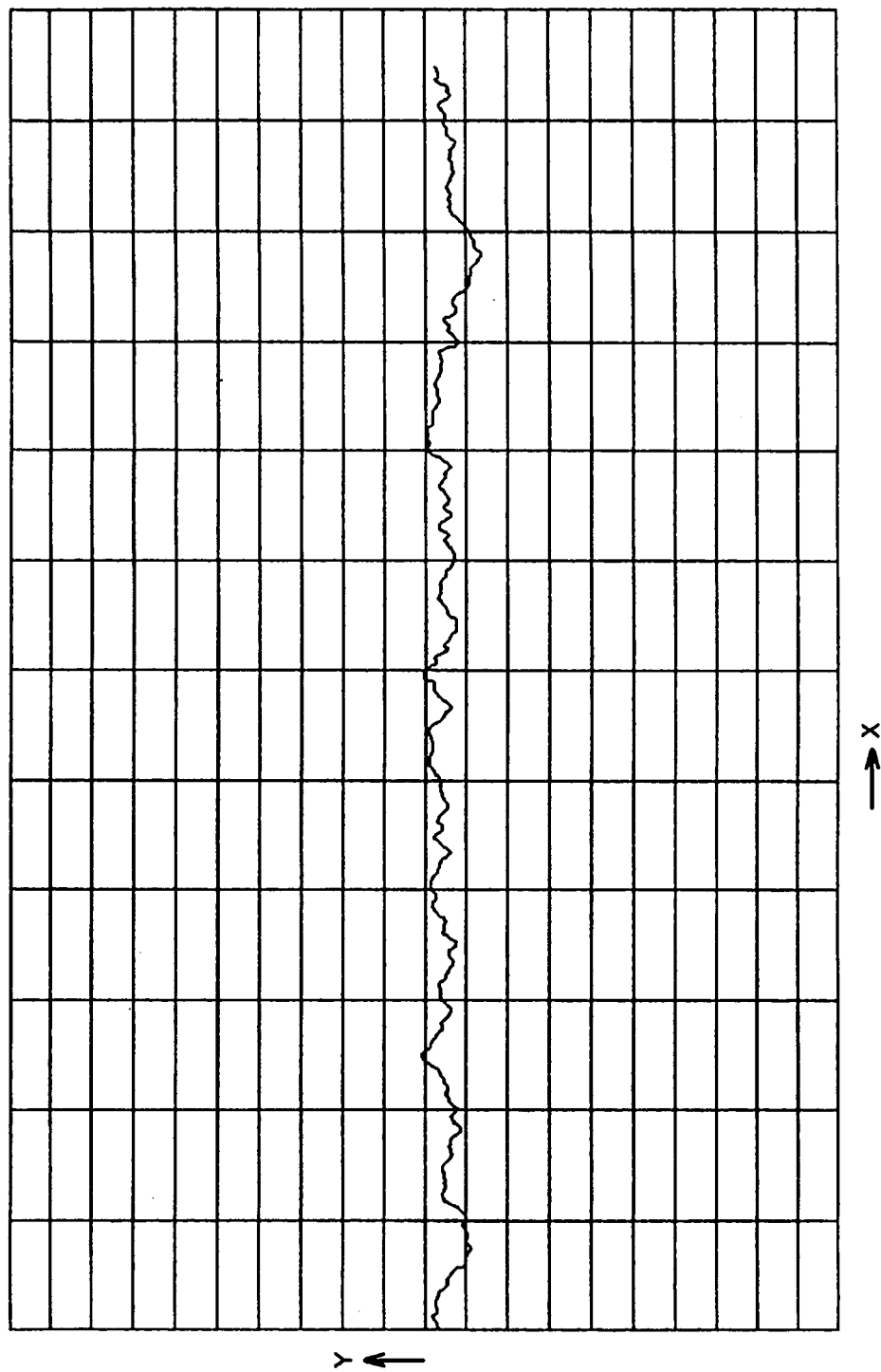
FIG. 10 is a graph showing surface appearance (thickness fluctuation) of a molded film by rotating the rotatable ring counterclockwise.

FIG. 10 shows fluctuation in thickness of the film formed according to the extruding condition 3B.

In FIGS. 8 to 10, x-coordinate represents a longitudinal direction of the film and y-coordinate represents fluctuation of film thickness (μ).

(Discussion on the Results)

1) As shown in TAB. 2, weld marks are observed in a film extruded on the condition 1A, where the rotatable ring is not rotated. When the film is wound around a paper pipe, a wound status of the film is gradually deteriorated.

2) The appearance of the film formed with rotating the rotatable ring is obviously better than that of the film formed without rotating the rotatable ring.

3) As can be judged from TAB. 2, the appearance of the wound film formed with rotating the rotatable ring at a faster rate is seems to be better than that of the film formed with rotating the rotatable ring at a slower rate.

4) As shown in FIG. 8, fluctuation in thickness of the film is remarkable.

5) As shown in FIG. 9, fluctuation in thickness of the film is reduced compared with fluctuation shown in FIG. 8 due to the rotating effect of the ring clockwise.

6) As shown in FIG. 10, fluctuation in thickness of the film is more reduced due to the rotating effect of the ring counterclockwise.

Compared results of the extrusion test 2 are shown in TAB. 3.

TABLE 3

| Rotational Direction | RPM | Seconds/ 1 Rotation | Colored Resin (kg) | No-colored Resin Consumption Amount (kg) | Time (min) |
|----------------------|-----|---------------------|--------------------|------------------------------------------|------------|
| 1AA No Rotation      | —   | —                   | 5                  | 10                                       | 40         |
| 1BB Clockwise        | 0.8 | 75                  | 5                  | 5                                        | 20         |
| 2BB Counter-clockwise| 0.8 | 75                  | 5                  | 3.5                                      | 14         |

(Discussion on the Results)

1) When non-colored resin is extruded at a rate of 15 kg/hr without rotating the rotatable ring, it takes ca. 40 minutes until traces of the colored resin are not observed.

2) When non-colored resin is extruded at a rate of 15 kg/hr by rotating the rotatable ring clockwise, it takes ca. 20 minutes until traces of the colored resin are not observed.

3) When non-colored resin is extruded at a rate of 15 kg/hr by rotating the rotatable ring counterclockwise, it takes ca. 14 minutes until traces of the colored resin are not observed.

4) When the rotatable ring is rotated, it takes about a half of time without rotating the rotatable ring.

5) When the rotatable ring is rotated counterclockwise, consumed amount of the uncolored resin is less than in the case when the rotatable ring is rotated clockwise.

(Evaluation of the Effects by the Present Invention)

<Evaluation 1>

The stability of a formed film and appearance of the film wound around the paper pipe are observed on the same condition. At the same time, thickness of the formed film is measured continuously.

<Evaluation 2>

The amount of the colored resin and the time to be required to consume the amount on the same condition are compared.

(Evaluated Results)

<Evaluated Result 1>

Effects by rotating the rotatable ring are obvious, when results of the extrusion test 1 in TAB. 2 and in FIGS. 8 to 10 are compared.

<Evaluation Result 2>

The results of the extrusion test 2 obviously indicate good effects attained by rotating the rotatable ring for exchanging resin color in the extruder, and the effects by rotating the rotatable ring in a reverse direction to a wound direction of the spiral of the spiral die.

As explained above, a homogeneous pipe body, an inflation film with/without drawing and a functional film can be obtained by dispersing molten resin homogeneously when the spiral die assembly by the present invention is employed, and a spiral die assembly capable of being applied to various molten resins and extruding conditions can be obtained.

What is claimed is:

1. A spiral die assembly comprising:
    a main body of said spiral die assembly;
    a mandrel having a spiral groove around its outer surface inserted in the inside of said main body; and
    a rotatable ring having a desired width fitted along the outer surface of said spiral groove and fitted in a portion of a die cylinder which forms the inner surface of said main body in a range corresponding to both ends of said spiral groove, wherein:
    molten resin is leaked into sliding gaps between said rotatable ring and said main body in order to function as a lubricant; and
    a discharging mechanism having passages and a needle valve for controlling amount of the molten resin to be discharged out of said spiral die assembly via said passages.

2. The spiral die assembly according to claim 1, wherein:
    said rotatable ring is controlled to rotate at a rate less than 60 rpm.

3. The spiral die assembly according to claim 1, wherein:
    the inner surface of said rotatable ring is finished so as to have a mirror grade, a range between 01 S and 6.3 S by the Japanese Industrial Standard 0601-1976, a satin finishing, a depth range between 4µ and 150µ, or a tooth formed surface parallelly or spirally arranged.

* * * * *